US010580003B2

(12) United States Patent
Gouessant

(10) Patent No.: US 10,580,003 B2
(45) Date of Patent: Mar. 3, 2020

(54) BANK CARD AND RESPONSE PROCESS TO A TRANSACTION REQUEST

(71) Applicant: IDEMIA France, Colombes (FR)

(72) Inventor: Hervé Gouessant, Nanterre (FR)

(73) Assignee: IDEMIA FRANCE, Colombes (FR)

(*) Notice: Subject to any disclaimer, the term of this patent is extended or adjusted under 35 U.S.C. 154(b) by 0 days.

(21) Appl. No.: 15/429,647

(22) Filed: Feb. 10, 2017

(65) Prior Publication Data
US 2017/0154335 A1 Jun. 1, 2017

Related U.S. Application Data

(63) Continuation of application No. 13/730,389, filed on Dec. 28, 2012, now abandoned.

(30) Foreign Application Priority Data

Dec. 30, 2011 (FR) ...................................... 11 62591

(51) Int. Cl.
G06Q 20/40 (2012.01)
G06K 5/00 (2006.01)
G06K 19/06 (2006.01)
G06Q 20/34 (2012.01)
G07F 7/02 (2006.01)
G07F 7/08 (2006.01)
G06Q 20/32 (2012.01)
G06Q 20/36 (2012.01)

(52) U.S. Cl.
CPC ........... *G06Q 20/4014* (2013.01); *G06K 5/00* (2013.01); *G06K 19/06009* (2013.01); *G06K 19/06028* (2013.01); *G06K 19/06037* (2013.01); *G06Q 20/3223* (2013.01); *G06Q 20/3274* (2013.01); *G06Q 20/34* (2013.01); *G06Q 20/342* (2013.01); *G07F 7/025* (2013.01); *G07F 7/0846* (2013.01); *G06Q 20/3276* (2013.01)

(58) Field of Classification Search
USPC .......................... 235/494; 705/1.1, 40, 17, 67
See application file for complete search history.

(56) References Cited

U.S. PATENT DOCUMENTS

| 5,450,491 | A | 9/1995 | McNair |
| 2005/0103837 | A1 | 5/2005 | Boyer |
| 2006/0143101 | A1 | 6/2006 | Johanns et al. |
| 2008/0082452 | A1* | 4/2008 | Wankmueller ......... G06Q 20/04 705/67 |
| 2008/0296367 | A1 | 12/2008 | Parkinson |
| 2009/0140044 | A1 | 6/2009 | Johanns et al. |
| 2009/0194599 | A1 | 8/2009 | Gindele |
| 2010/0008535 | A1 | 1/2010 | Abulafia et al. |
| 2011/0238473 | A1* | 9/2011 | Sankolli ................. G06Q 20/32 705/14.23 |

(Continued)

FOREIGN PATENT DOCUMENTS

| WO | WO 95/06371 A1 | 3/1995 |
| WO | WO 01/58080 A1 | 8/2001 |
| WO | WO 2006/044940 A2 | 4/2006 |

*Primary Examiner* — Oluseye Iwarere
*Assistant Examiner* — Reva R Danzig
(74) *Attorney, Agent, or Firm* — Arent Fox, LLP

(57) ABSTRACT

The invention relates to a bank card (100) comprising a presentation surface of a pictogram (120) coding at least one item of information for executing a transaction.

20 Claims, 5 Drawing Sheets

(56) References Cited

U.S. PATENT DOCUMENTS

2012/0150737 A1\* 6/2012 Rottink ............... G06Q 20/102
705/40
2012/0191522 A1\* 7/2012 McLaughlin .......... G06Q 50/01
705/14.23

\* cited by examiner

BANK CARD AND RESPONSE PROCESS TO A TRANSACTION REQUEST

CROSS-REFERENCE TO RELATED APPLICATIONS

This application is a continuation of U.S. application Ser. No 13/730,389 filed on Dec. 28, 2012, which claims priority to French Application No. 1162591 filed on Dec. 30, 2011. The disclosures of the prior applications are hereby incorporated by reference in their entirety.

TECHNICAL FIELD AND PRIOR ART

The invention relates to the field of secure payment means, such as for example bank cards, especially microcircuit bank cards.

When a transaction is made in the absence of a payment terminal capable of reading the card by itself, the holder of the card must input his card number on a keypad, and often the security number of the card and the validity date of the latter. This operation is fastidious and requires the user to concentrate and not input incorrect numbers which are long.

Document US2010/0008535 discloses a portable electronic device for making payment by bank card simply by optical reading of the surface of the card. The device can be a mobile telephone and utilises recognition of characters printed on the card by means of a camera, application of segmentation of the surface of the card and recognition of characters on the different segments.

Document WO01/58080 also discloses a payment card fitted with a ultrasonic transducer communicating with any device fitted with a microphone and/or loudspeakers so as to allow secure authentication of the card in the absence of a card reader. In the same document, a barcode reader is also fitted with such a transducer and communicates in the same way. It is used for reading merchandise barcodes in a shop and connecting to the web site of the merchandise manufacturer, so as to ask about the benefit of promotional offers.

The disadvantage of these different solutions is primarily first that of being minimally secure and difficult to utilise for a busy user who is obliged to position his card precisely in front of the camera, and secondly is that it needs specific equipment. There is therefore a need for secure remote payment solutions which are easy and quick to use.

For this, a card and a process are proposed.

SUMMARY OF THE INVENTION

The invention consists of a bank card comprising a presentation surface of a pictogram coding at least one item of information for executing a transaction. This information can be a number of the card, a validity date of the card, a name or first name of an owner of the card, a category identifier of a transmitter of the card, an identifier of a transmitter of the card, a security code of the card, or a one-time password.

According to a particular characteristic, the pictogram is a barcode, for example a 2D code, for example a QR code (Quick Response), or also a dynamic pictogram.

According to an advantageous characteristic, the card comprises a controller for generating a pictogram valid for a single transaction.

According to various embodiments of the invention, the surface is an LCD screen, or a layer synthetic printed or etched material, included in the card body or attached for example by adhesion.

The pictogram preferably codes an address of a transaction server.

The invention also consists of a response process to a transaction request comprising steps consisting of receiving a transaction request comprising a pictogram coding at least one item of information for executing a transaction and complementary information, extracting from the pictogram said information for executing a transaction, and as a function of said information for executing a transaction and of the complementary information, as well as predefined authorisation rules, sending an authorisation or a refusal in response to the transaction request.

The process is at least partially executed by a server connected to an extended telecommunications network, or by a payment terminal having a keypad and a camera, or even by a mobile electronic unit having a keypad and a camera.

According to an embodiment, the process also comprises the display on a screen of an input box for an alphanumeric chain constituting the complementary information.

In a variant, the predefined authorisation rules comprise a rule according to which authorisation is given as a function of a result of a comparison test applied to the complementary information.

According to a particular mode, the process comprises sending a message addressed to a message service of an owner of payment means comprising a one-time identification element, then receipt of an identification element provided by a requester of the transaction request and comparison of the one-time identification element and of the identification element provided.

The process can also comprise sending at least one characteristic of the transaction addressed to a message service of an owner of payment means, then receipt of an order form signed by a requester of the transaction request and authentication of a signature of the order form.

Finally, in an embodiment, said information for executing a transaction is a one-time password.

Therefore, of other advantages cited by way of non-limitation, the invention allows the deployment of a contactless bank payment solution at less cost because of equipment for input and information processing already widely deployed in user devices or individual public equipment (mobile telephones, computers, tablets equipped with camera).

It also implements a secure and contactless payment solution which is quick to use for bank transactions. The user avoids the fastidious step of inputting banking information, or information for executing a transaction. He is also protected against possible fraudulent copy of banking information in alphanumeric form on the card which, in the absence of a pictogram coding it, must be recopied during use of the latter in commerce.

DETAILED EXPLANATION OF THE INVENTION

Figure 1:
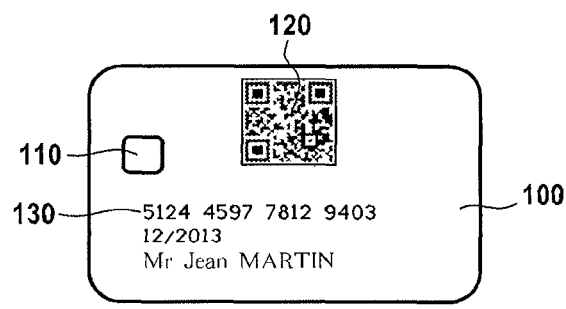
FIG. 1 shows a card according to an embodiment of the invention.

FIG. 1 illustrates a bank card 100 according to the invention. This is a card of dimensions 54×85.6×0.76 mm, but other dimensions can be used. It comprises a microcircuit 110 including a controller and memory in a secure assembly with flush contacts.

On one of its surfaces, here the surface on which the contacts of the microcircuit 110 are flush, the card also presents a two-dimensional barcode 120, responding to the QR standard (Quick Response). Other two-dimensional barcode standards could be used, and a one-dimensional barcode is also a possible variant. A pictogram responding to other coding conventions can also be used, provided it codes information for a transaction.

This barcode 120 is affixed to the surface of the card via an attached sticker, ink printing on the upper layer of the card, laser etching of the upper layer, or laser processing of a photosensitive layer covered by a protective layer or another physical action which forms a visible diagram by a reading tool (a camera, for example) external to the card. The barcode 120 can be affixed to any one of the faces of the card, for example to the front face near bank-related elements presented in alphanumeric form, or to the rear face near bank-related elements presented in the form of a magnetic strip.

In some embodiments, the card can have, in alphanumeric form and on this same surface or on its other surface, the number of the card according to the standard ISO/IEV 7812. This is a succession of 16 digits (each between 0 and 9), grouped in blocks of 4 digits. The card can also show the expiration month and the identity of the owner, in the form of first name then last name. These different elements constitute bank-related elements presented in alphanumeric form 130.

Figure 4:
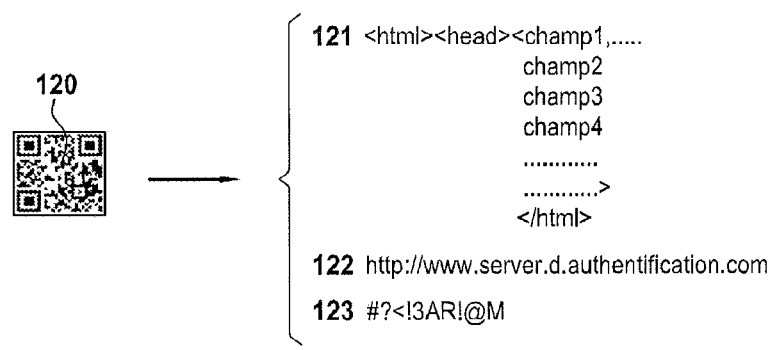
FIG. 4 shows a detail of the card of FIG. 1.

The barcode 120 can be scanned by a barcode reader connected to adapted software. In an embodiment it codes the information presented in FIG. 4.

Figure 2:
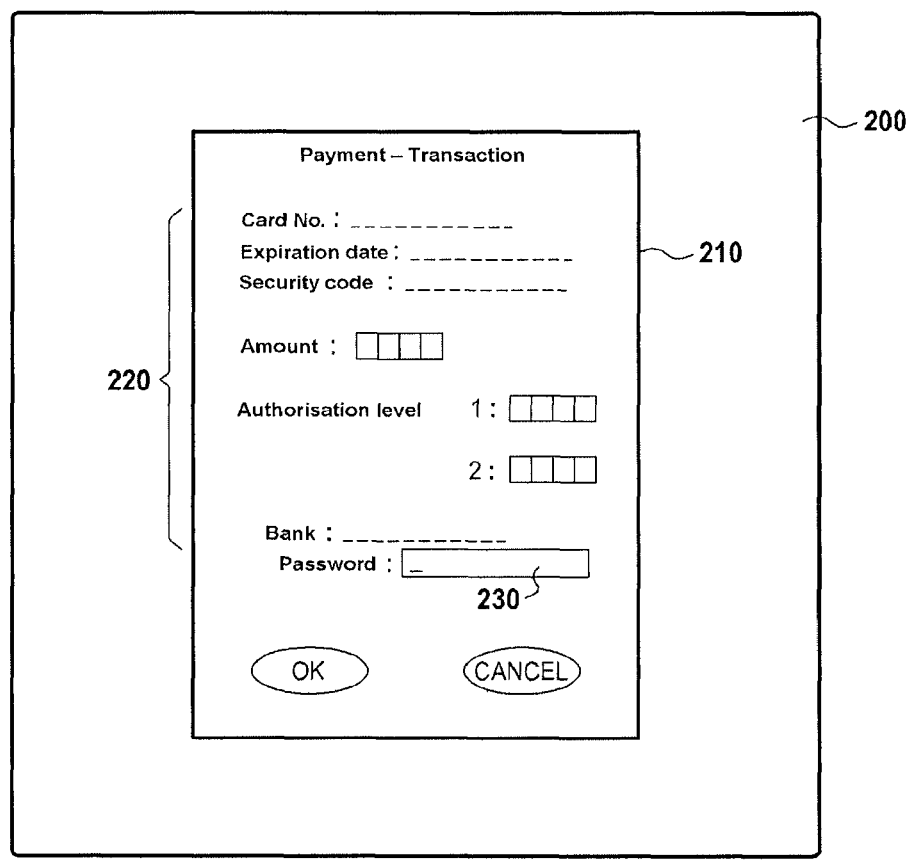
FIG. 2 shows an element generated during use of a card such as that presented in FIG. 1.

First of all, the barcode 120 codes an html command 121 (html means "hypertext markup language") describing a frame 210 illustrated in FIG. 2, and pre-filled information 220 to be displayed in the frame 210. The pre-filled information 220 can be indicated explicitly in the html command 121 or alternatively only an address memory where the withdrawer can be indicated in the command.

Figure 3:
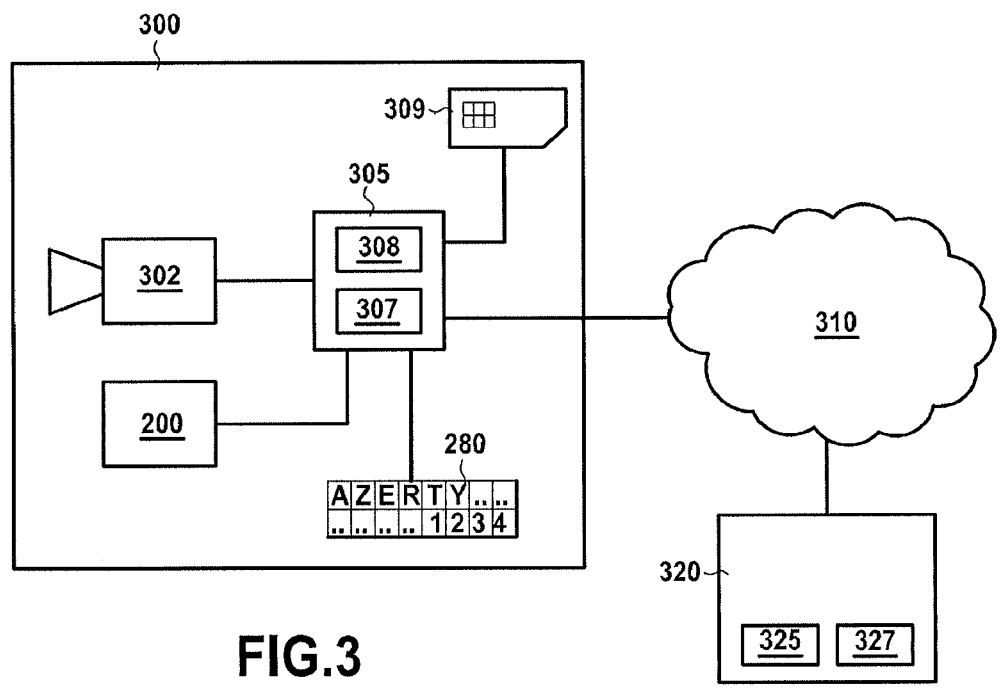
FIG. 3 shows an arrangement used for executing a process according to an embodiment, and cooperating with a card such as presented in FIG. 1.

The barcode 120 can also code an address 122 identifying a server 320 on a network (illustrated in FIG. 3). Here it is an address on the Internet network, but it could also be a telephone link to an audio-telephone identification service, or a telephone link to an SMS server.

Finally, in some embodiments the barcode 120 also codes encrypted information 123 useful for a local control operation, to be explained hereinbelow.

The structure of the frame 210 is presented in FIG. 2. The frame 210 is displayed on a screen 200 of a terminal used for a transaction. It shows different pre-filled information 220, such as the number of the card, its expiration date, the security code of the card (3-digit code often affixed to the rear of bank cards), and amounts corresponding to two different levels of authorisation.

The first is a maximum transaction amount not requiring any particular control operation (called authorisation level 1), and the second is a maximum level beyond which no transaction is authorised with the card 100 (called authorisation level 2). The frame 210 also shows the name of the sending bank of the card 100 and a dialogue box (input box 230) for entering a password. Finally, the frame includes two buttons—OK and CANCEL (or "agree" and "cancel").

The amount of the transaction is either to be filled in by the user in a dialogue box, or prefilled, as is illustrated in FIG. 2, since the html code of the frame 210 provides for obtaining this amount from the terminal memory used for the transaction.

FIG. 3 illustrates a reading terminal 300, used for the transaction, and which is connected by a network 310 to a server 320.

The reading terminal 300 comprises a keypad 280 (or at least a man-machine interface for inputting an alphanumeric chain), a camera 302 for reading barcodes 2D, a SIM card (Subscriber Identification Module 309) and a control unit 305 comprising especially local software 307 for processing transaction requests. A transaction counter 308 is also present in the control unit 305 or alternatively in the SIM card 309 for greater security (alternative not illustrated). In a variant, the SIM card is included in the control unit 305. The screen 200 forms part of the reading terminal 300.

The server 320 can comprise in a memory a reference password 325 associated with the owner of the card 100 and a messaging address 327 associated with the owner of the card 100.

Figure 5:
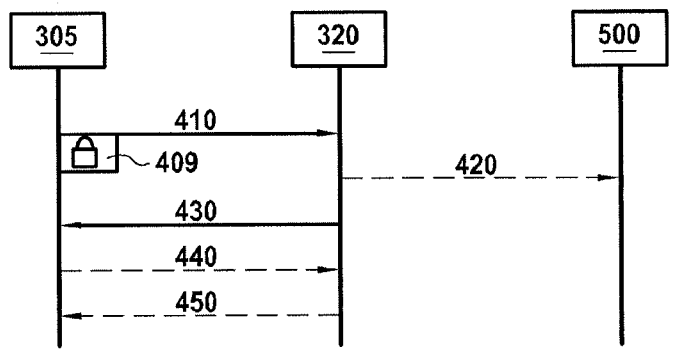
FIG. 5 shows an aspect of a response process according to an embodiment of the invention.
Figure 6:
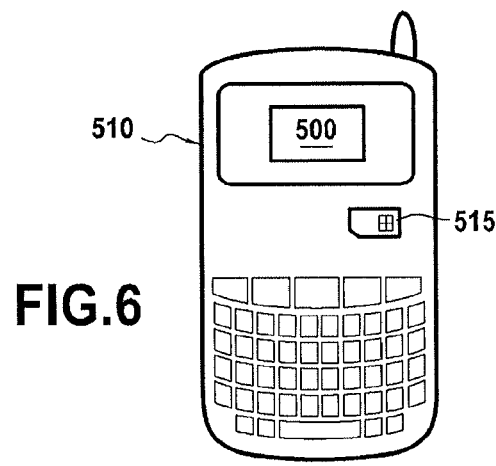
FIG. 6 shows a mobile electronic unit used for executing a process according to an embodiment.

FIG. 5 shows message transfers between the control unit 305 (or the SIM card 309), the server 320 and a message service 500 of the owner of the card 100. This message service is for example displayed on the screen of a mobile telephone 510 illustrated in FIG. 6. This can be a message service for SMS or MMS messages on the GSM network, or a message service of email type consultable on a mobile telephone or a personal computer connected to the Internet, via a wire or cellular connection.

By way of cryptographic means present in the SIM card 309, the control unit 305 performs a signing step 409 of a request 410 which is sent to the server 320, the address 122 of which is known by reading of the barcode 120. The request 410 comprises the amount of the transaction. The signature 409 is based on the value of the transaction counter 308, which is also sent unencrypted in the request.

The server 320 verifies whether the signature of the request is authentic. Then, if this is the case and if the amount of the transaction exceeds the maximum transaction amount needing no particular control operation (authorisation level 1), the server 320 sends a message 420 to the message service of the owner of the card 100 (the address 327 of which is known from the server 320), asking for confirmation and comprising a token, which can be coded. The token is decoded if necessary by the microcircuit card 515 (SIM card) of the mobile terminal 510 and displays on the screen of the latter. It can be constituted by an alphanumeric chain.

The control unit 305 is also prevented from sending a token by the server 320 during a step 430 comprising an initial response of the server. The owner of the message service can then submit the token to the control unit 305, for example via the keypad 280. The submitted token is then transmitted by the control unit 305 to the server 320 during a step 440. If the server 320 notices that this submitted token is identical to that previously transmitted to the message service 500, it validates the transaction and informs the control unit 305 thereof during a step 450 comprising a second response of the server.

If the transaction does not exceed the maximum transaction amount needing no particular control operation (authorisation level 1), a response step 430 from the server to the control unit 305 is performed, indicating that the transaction has been processed.

Figure 7:
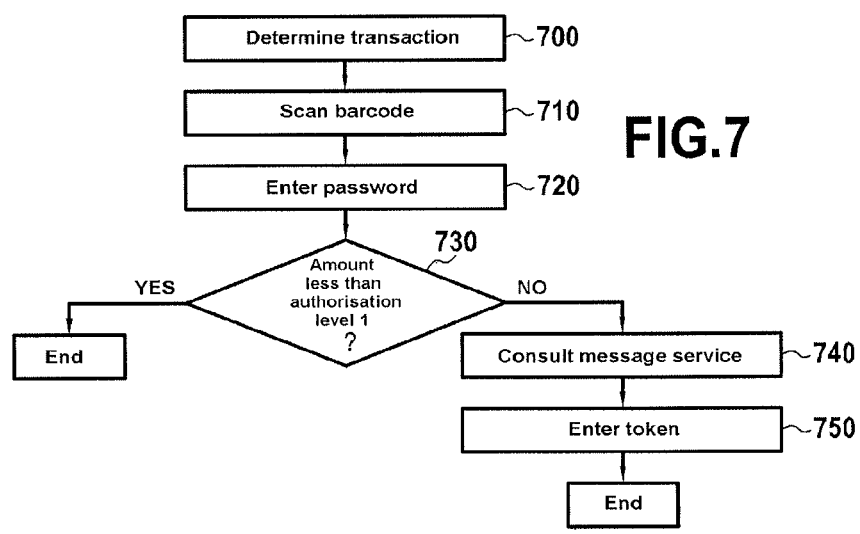
FIG. 7 shows the mode of use of the invention by the owner of the card of FIG. 1.

The process according to this embodiment is illustrated in FIG. 7, from the viewpoint of the user. In this process, determination of the transaction during a step 700 is first carried out, using the reading terminal 300. This determination can be done by selection and validation of an online Internet purchase (use shown in FIGS. 8 and 9), or use of an application dedicated to purchases in a shop (supermarket or network of shops equipped with codes legible by camera, as is shown in FIG. 11), or by a merchant having a payment terminal (use shown in FIG. 10). The information obtained is stored in memory of the control unit 305.

The holder of the bank card 100 scans the barcode 120 with the camera 302 during a step 710. The control unit 305 extracts the code 121 of the frame 210 and the latter is displayed on the screen 200, for some prefilled fields using the information fixed during the determination step of the transaction 700, recovered in the memory of the reading terminal 300.

Local control of the identity of the user is also carried out via an applet in a secure element. This constitutes a step 720 during which the user is invited to enter his password in the input box 230. The user then agrees to the transaction by pressing the "OK" button after having verified the prefilled information 220. The password entered into the input box 230 is compared to that contained in the encrypted information 123.

Instead of password verification, other secure solutions can be executed, such as verification of biometric data, a PIN code, or a list of choices proposed on a man-machine interface, this information being present in all encrypted information 123.

Control can also be carried out remotely by the server 320, using the reference password 325. In this case, the request 410 comprises transfer of the password entered by the user into the dialogue box.

In FIG. 7, the left area corresponds to a scenario without the particular verification operation being performed, and that on the right to a scenario with the particular verification operation. The additional steps in this area are those shown in dotted lines in FIG. 5.

A test 730 is conducted to determine whether the amount of the transaction exceeds authorisation level 1. This test is conducted either by the control unit 305 (in which case the result of the test is included in the request 410) or by the server 320 (in which case the server 320 previously stores the authorisation level associated with each card 100). If the amount of the transaction exceeds authorisation level 1, the sending step 420 of a message to the message service of the owner is performed by the server 320. The user consults his message service 500 during a step 740, discovers the token and recopies the latter into the reading terminal 300 using the keypad 280, during a step 750.

Figure 12:
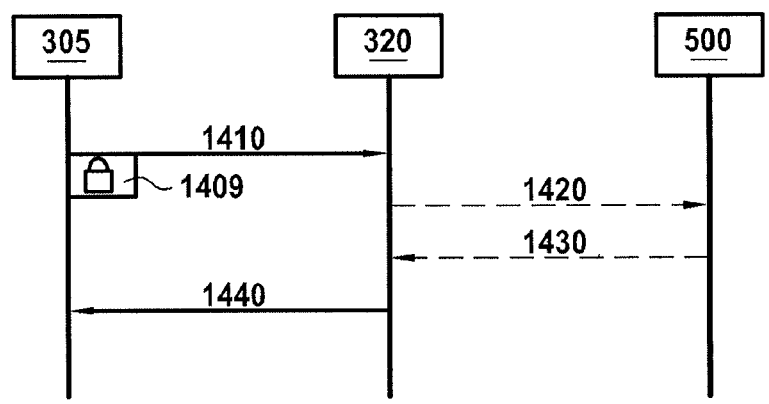
FIG. 12 shows an alternative to the embodiment presented in FIG. 5.

In a variant illustrated in FIG. 12, the control unit 305 performs a signature step 1409 of a request 1410 which is sent to the server 320 by way of cryptographic means present on the SIM card 309, the request comprising the amount of the transaction.

The server verifies the authenticity of the signature. Next, if the amount of the transaction exceeds the maximum transaction amount not needing a particular verification operation (authorisation level 1), the server 320 sends a message 1420 to the message service of the owner of the card 100 (whereof the address 327 is known to the server), asking for confirmation. This message comprises at least one characteristic of the intended transaction, and preferably comprises the nature of the goods or service bought, the quantity, the unit price and the total price.

The owner of the message service responds to this by entering his password or a previously agreed response code and by addressing via the massage service a response 1430 including the password or the code, as well as the characteristics of the transaction taken from the preceding message. This response constitutes a signed purchase order. If the signature of the order form (here, the password) is authenticated by the server 320, the latter reacts by sending an acceptance message 1440 of the response addressed to the control unit 305.

If the amount of the transaction does not exceed the authorisation level 1, the server 320 sends the acceptance message 1140.

FIGS. 8 to 11 illustrate modes of use of the invention.

Figure 8:
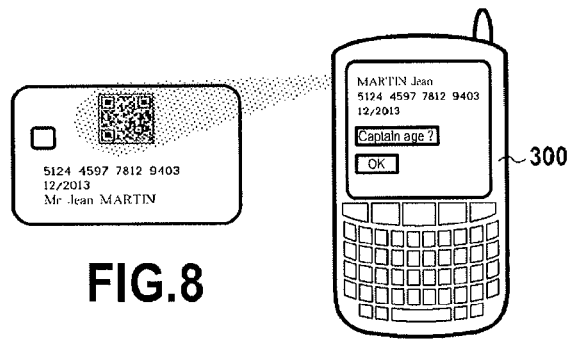
FIGS. 8 to 11 show use scenarios of the invention.
Figure 9:
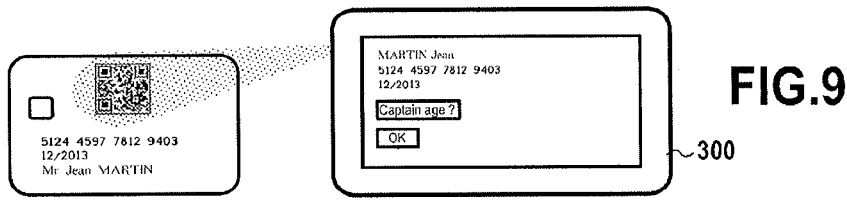

A first mode of use is a purchase by means of a mobile telephone having a camera and connected to the Internet, comprising the reading terminal 300. This is illustrated in FIG. 8, where the user of the telephone scans the barcode of the card 100 with the camera. He is asked for a password in the input box 230 of the frame 210. If the password is entered correctly by the user and if the amount of the transaction is less than the authorisation level 1, the transaction is finalised on this basis, without further verification.

A second mode of use is a purchase by means of a fixed terminal (typically a computer), or a touch tablet, comprising the reading terminal 300 (illustrated in FIG. 9) having a webcam and Internet access. In this embodiment, the reading terminal 300 does not include a SIM card 309, and the request 410 or 1410 is not signed.

Figure 10:
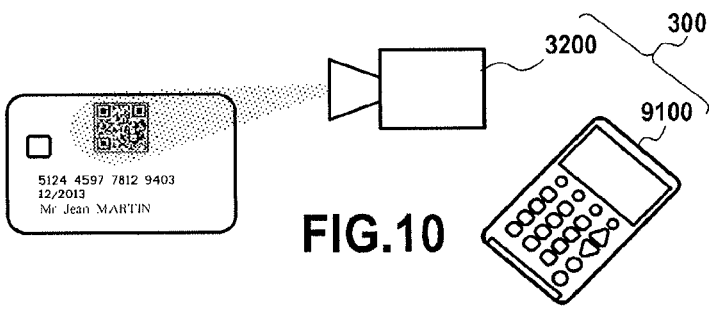
Figure 11:
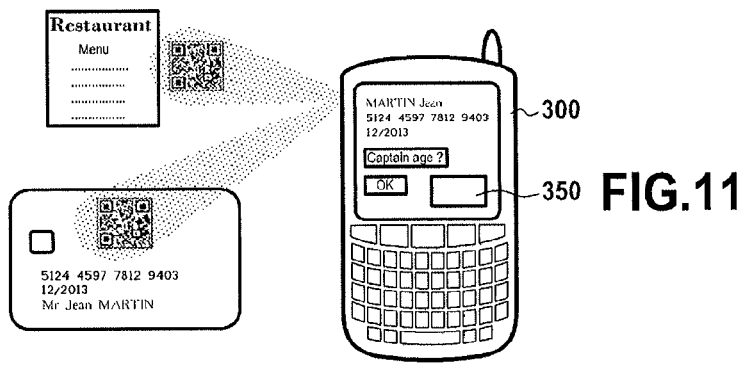

A third mode of use, illustrated in FIG. 10, is a purchase in a point of sale having a conventional payment terminal for bank cards with microcircuit and operating by contact. Such a terminal includes keypad and screen assembly 9100 adapted for inputting a PIN code. According to the invention a camera 9200 is added to the latter for scanning the barcode. The assembly of the conventional terminal and the camera, as well as the adequate software application constitutes the reading terminal 300. In this mode of use, the function of the conventional contact reading terminal 9100 of the microcircuit is not used.

A fourth mode of use, illustrated in FIG. 11, is a purchase made in a shop or a restaurant. The vendor (here a restaurant) is identified by a barcode which is scanned by the camera of a mobile telephone comprising the reading terminal 300. The mobile telephone acting as terminal 300 is then used to scan the barcode 120 of the card 100. An application 350 recorded in the mobile telephone makes the link between the two identifiers and organises the transaction.

In another embodiment, the barcode 120 is presented on a liquid crystal screen included in the card body. The barcode can be a dynamic code, generated as per the logic rules executed by a controller included in the card, and preferably in a secure circuit of the card, such as microcircuit 110. The barcode represents one-off passwords, delivered at each transaction attempt. The server 320 verifies the password either by verifying it on the basis of transmitted data, or on the basis of a pre-recorded list. The dynamic code can be generated from the transaction counter 308.

The invention is not limited to the particular embodiments presented here, but extends to all variants within the scope of the claims.

The invention claimed is:

1. A system for processing a request, comprising:
a first device that extracts a Hyper Text Markup language (HTML) command encoded in a pictogram and cryptographically signs the request,
wherein the pictogram is dynamically generated for each request,
wherein the HTML command describes items of information for the request, the items of information at least comprising an amount for the request, an amount corresponding to a first authorization level, and an amount corresponding to a second authorization level different from the first authorization level, and the pictogram also coding an encrypted information, and
wherein the request also includes a complementary information, the complementary information being an information inputted by a user, by means of a man-machine interface of the first device; and
a second device connected to an extended telecommunications network,
wherein the second device receives the request from the first device,
wherein as a function of the at least one item of information and the complementary information, as well as predefined authorization rules, the second device sends authorization or refusal to the first device in response to the request, and
wherein the second device:
controls the identity of the user by comparing the complementary information to the encrypted information,
determines whether the amount for the request exceeds the amount corresponding to the first authorization level, so that:
when the amount for the request exceeds the amount corresponding to the first authorization level, the second device performs a particular control operation,
when the amount for the request is below the amount corresponding to the first authorization level, the second device sends to the first device a response indicating that the request has been processed, and
determines whether the amount for the request exceeds the amount corresponding to the second authorization level, not authorizing the request when the amount for the request exceeds the amount corresponding to the second authorization level.

2. The system of claim 1, wherein the first device is a payment terminal having a keypad and a camera.

3. The system of claim 1, wherein the first device is a mobile electronic unit having a keypad and a camera.

4. The system of claim 1, wherein the second device is a server connected to the extended telecommunications network.

5. The system of claim 1, wherein the first device includes a screen for displaying an input box for an alphanumeric chain constituting the complementary information.

6. The system of claim 1, further comprising:
a third device having a message service,
wherein the particular control operation comprises:
the third device receiving a message from the second device addressed to the message service, and the message including a one-time identification element,
the second device receiving an identification element provided by the first device separate from the request, and
the second device comparing the one-time identification element sent to the third device to the identification element provided by the first device.

7. The system of claim 6, wherein the second device sends the authorization or the refusal to the first device based on the comparison of the one-time identification element to the identification element.

8. The system of claim 1, further comprising:
a third device having a message service,
wherein the particular control operation comprises:
the third device receiving a message from the second device addressed to the message service asking for a confirmation,
the second device receiving a response to the message from the third device, wherein the response constitutes a signed order form,
the second device authenticating the signed order form, and
the second device sending an acceptance message to the first device when the signed order form is authenticated.

9. The system of claim 1, wherein complementary information for the request includes a password.

10. The system of claim 1, wherein the first device determines the address identifying the second device on the extended telecommunications network by scanning the pictogram.

11. The system of claim 1, wherein the signature of the request is based on a value of a transaction counter of the first device.

12. The system of claim 1, wherein the complementary information is a password, a PIN code, a biometric data, or a choice proposed on the man-machine interface of the first device.

13. A reading terminal for processing a request, comprising:
a camera; and
a control unit, wherein the control unit extracts a Hyper Text Markup language (HTML) command encoded in a pictogram using the camera and cryptographically signs the request, wherein the pictogram is dynamically generated for each request, and wherein the HTML command describes items of information for the request, the items of information at least comprising an amount for the request, an amount corresponding to a first authorization level, and an amount corresponding to a second authorization level different from the first authorization level, and the pictogram also coding an encrypted information,
wherein the request also includes a complementary information, the complementary information being an information inputted by a user, by means of a man-machine interface of the reading terminal,
wherein the control unit sends the request with the at least one item of information to a server connected to an extended telecommunications network, and wherein the control unit receives from the server authorization or refusal to the request as a function of the at least one item of information as well as predefined authorization rules, the server controlling the identity of the user by comparing the complementary information to the encrypted information, determining whether the amount for the request exceeds the amount corresponding to the first authorization level, so that when the amount for the request exceeds the amount corresponding to the first authorization level, the server performs a particular control operation, and when the amount for the request is below the amount corresponding to the first authorization level, the server sends to the reading terminal a response indicating that the request has been processed, and the server determining whether the amount for the request exceeds the amount corresponding to the second authorization level, not authorizing the request when the amount for the request exceeds the amount corresponding to the second authorization level.

14. The reading terminal of claim 13, further comprising a keypad.

15. The reading terminal of claim 14, wherein the keypad is used to provide an identification element that is sent by the reading terminal to the server for the particular control operation, the server comparing the identification element to a one-time identification element sent by the server to a message service on a device.

16. The reading terminal of claim 13, further comprising a SIM card, wherein the control unit performs a signing step of the request sent to the server by way of cryptographic means present in the SIM card.

17. A server for processing a request, comprising:
a memory; and
a connection to an extended telecommunications network,
wherein the server receives, from a terminal device, the request being cryptographically signed and including a complementary information and items of information described in a Hyper Text Markup language (HTML) command that is dynamically generated for each request and extracted by the terminal device from a pictogram,
the items of information at least comprising an amount for the request, an amount corresponding to a first authorization level, and an amount corresponding to a second authorization level different from the first authorization level, and the pictogram also coding an encrypted information,
the complementary information being an information inputted by a user, by means of a man-machine interface of the terminal device,
wherein the server sends authorization or refusal to the terminal device in response to the request as a function of the complementary information and the at least one item of information, as well as predefined authorization rules, and
wherein the server:
controls the identity of the user by comparing the complementary information to the encrypted information,
determines whether the amount for the request exceeds the amount corresponding to the first authorization level, so that:
when the amount for the request exceeds the amount corresponding to the first authorization level, the server performs a particular control operation,
when the amount for the request is below the amount corresponding to the first authorization level, the server sends to the terminal device a response indicating that the request has been processed, and
determines whether the amount for the request exceeds the amount corresponding to the second authorization level, not authorizing the request when the amount for the request exceeds the amount corresponding to the second authorization level.

18. The server of claim 17, wherein the particular control operation comprises:
the server sending, to a message service of a mobile electronic unit, a message having a one-time identification element,
the server receiving an identification element provided by the terminal device separate from the request, and
the server comparing the one-time identification element sent to the mobile electronic unit to the identification element provided by the terminal device.

19. The server of claim 18, wherein the server sends the authorization or the refusal to the terminal device based on the comparison of the one-time identification element to the identification element.

20. The server of claim 17, wherein the particular control operation comprises:
the server sending, to a message service of a mobile electronic unit, a message asking for a confirmation,
the server receiving, from the mobile electronic unit, a response to the message that constitutes a signed order form,
the server authenticating the signed order form, and
the server sending an acceptance message to the terminal device when the signed order form is authenticated.

* * * * *